Jan. 17, 1933.  F. O. BERGSTRAND  1,894,392
GAUGE FOR CONCRETE FLOORS
Filed Nov. 9, 1931  2 Sheets-Sheet 1
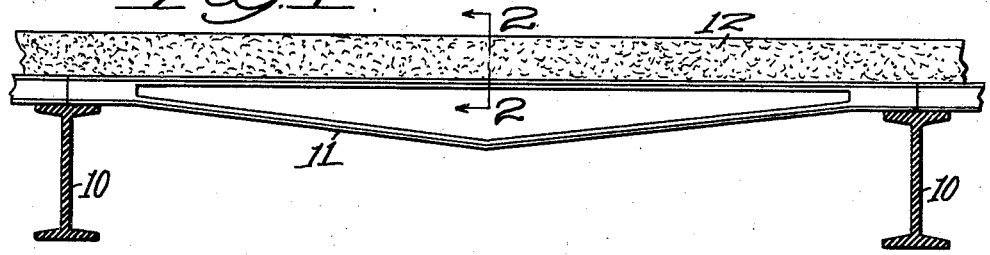
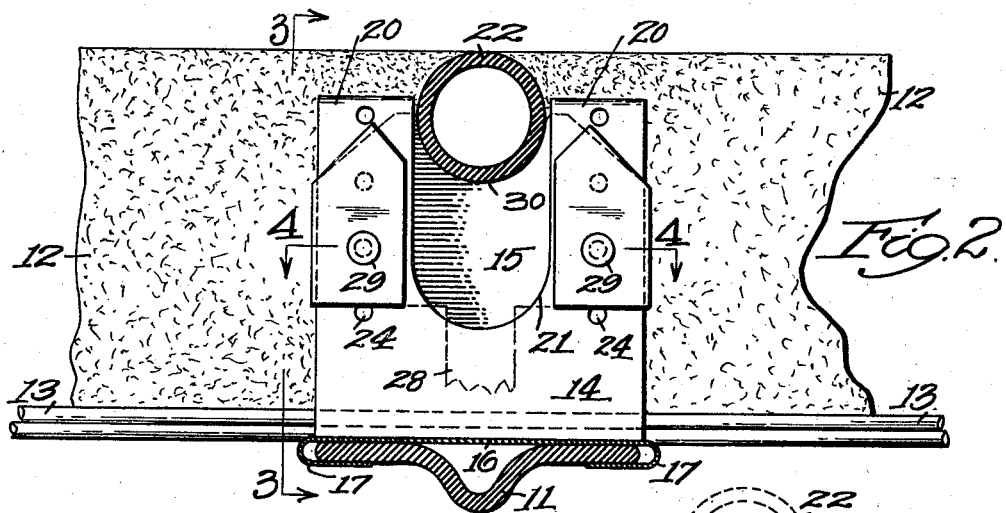
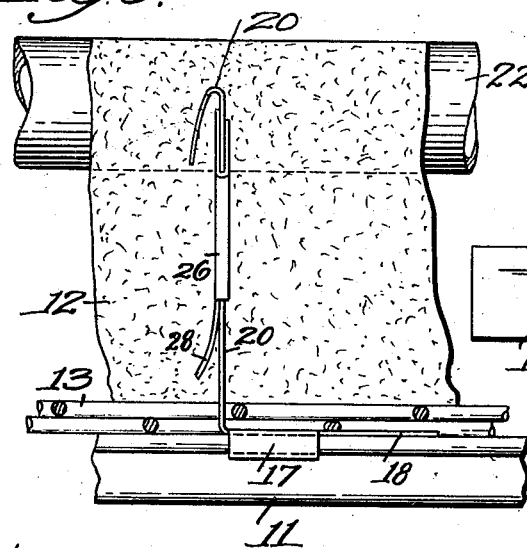
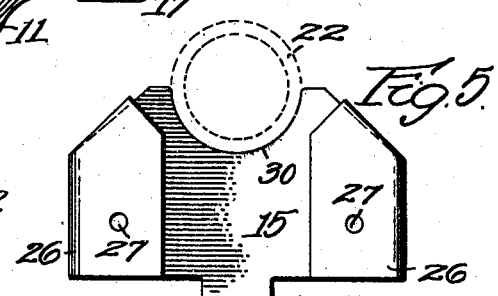
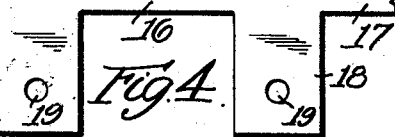
Inventor
Frank O. Bergstrand Jan. 17, 1933. F. O. BERGSTRAND 1,894,392
GAUGE FOR CONCRETE FLOORS
Filed Nov. 9, 1931  2 Sheets-Sheet 2
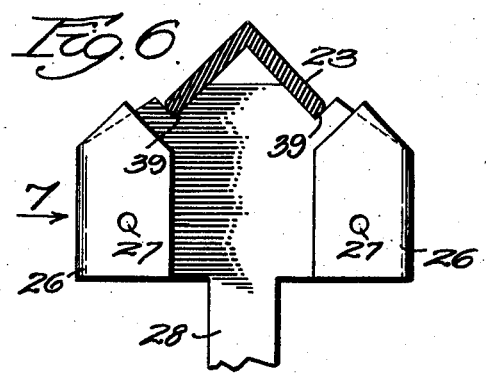
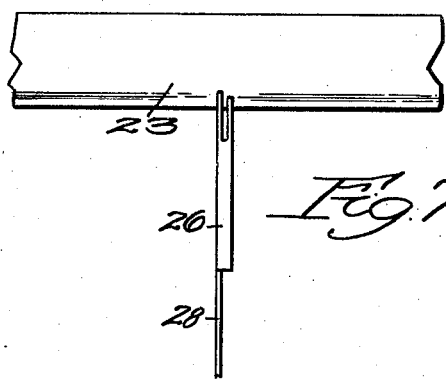
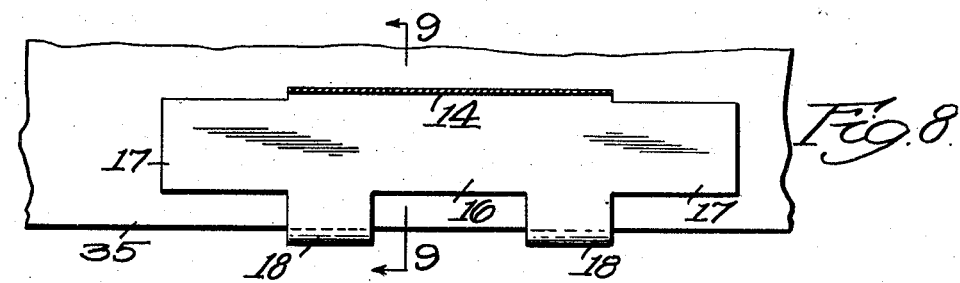
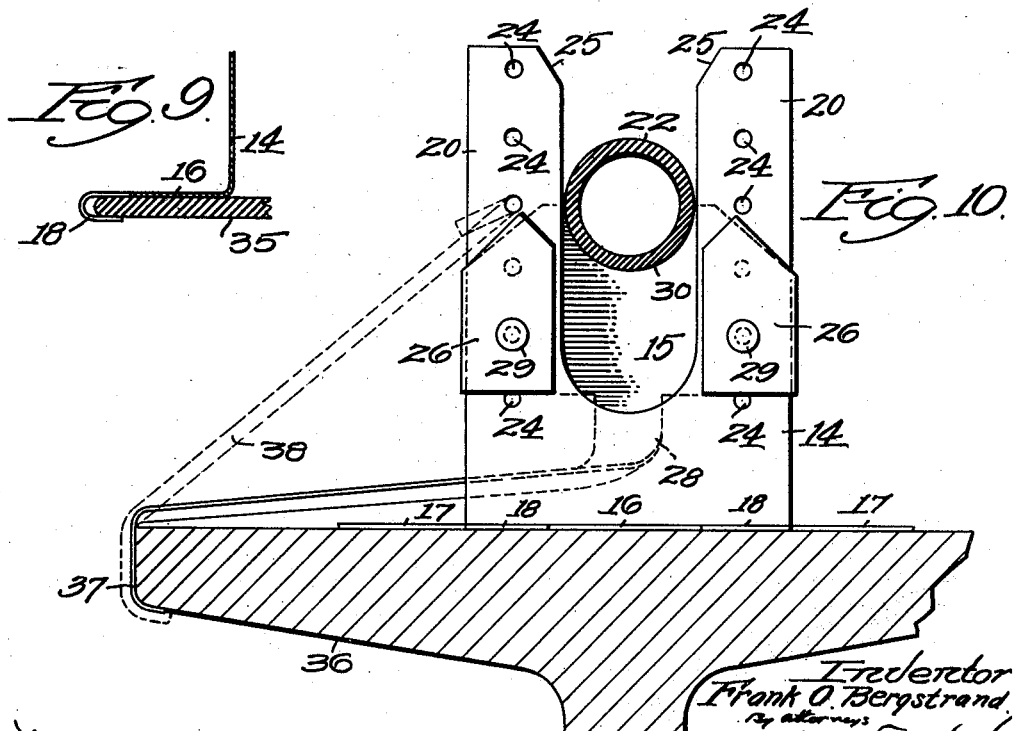

Patented Jan. 17, 1933

1,894,392

UNITED STATES PATENT OFFICE

FRANK O. BERGSTRAND, OF WORCESTER, MASSACHUSETTS

GAUGE FOR CONCRETE FLOORS

Application filed November 9, 1931. Serial No. 573,897.

The principal object of this invention is to provide a light inexpensive gauge by which the bars or pipes used for determining the level of concrete, or other floors of plastic material, can be placed at different heights as desired for the particular thickness of floor, a single construction of gauge being used for all thicknesses of floor.

Other objects of the invention are to provide a construction in which the thickness of the floor is determined by the adjustment of the gauge and the gauge is so made that no measuring has to be done; to provide a construction of gauge which can be made very cheaply in large quantities to serve for floors of various standard thicknesses; to provide anchorage for the gauge to hold it in proper position while the concrete is being laid, and to provide a construction which, by a simple change in one of the features of the gauge, will be suitable for use either with a pipe or an angle bar or any other design of strip employed to determine the level of the concrete.

Other objects and advantages of the invention will appear hereinafter.

Reference is to be had to the accompanying drawings, in which

Fig. 1 is a side view of a part of a concrete floor with the bar joist shown in elevation;

Fig. 2 is an enlarged sectional view on the line 2—2 of Fig. 1;

Fig. 3 is a sectional view on the line 3—3 of Fig. 1;

Fig. 4 is a horizontal sectional view on the line 4—4 of Fig. 1;

Fig. 5 is a view similar to Fig. 2 showing the adjustable part of the gauge alone;

Fig. 6 is a view similar to Fig. 5 showing a modification and the adjustable member for use with an angle bar;

Fig. 7 is an edge view of the same;

Fig. 8 is a view similar to Fig. 4, taken at a lower elevation showing a different position of the gauge;

Fig. 9 is a sectional view on the line 9—9 of Fig. 8, and

Fig. 10 is a view similar to Fig. 2 showing modifications employed when the gauge is used on a wide bar joist.

In the construction of concrete floors of the latest type, bar joists are used between the girders and the thickness of the concrete floor and its level condition is determined by wood strips, strips or bars supported on blocks or the like. In other words the strip or bar is supported with its upper surface at exactly the same elevation as the upper surface of the concrete floor. The concrete is then applied so that this strip or bar is just level with it at the top. Before the concrete fully hardens the strip or bar is removed and the space left by it is filled later with concrete, made level, of course, with the rest of the floor. This procedure has not proved fully satisfactory as it renders it difficult to get the floor level on account of the unevenness of the wood strips. It is also difficult to provide the supporting blocks in such a way that the floor will be of just the right height and these blocks have to be prepared for each height or thickness of flooring. Measuring has to be done and the blocks cut to size, which sometimes introduces error.

In laying a floor in accordance with the present invention the girders 10, or other supports, are used as usual and bar joists 11 are located from girder to girder as shown in Fig. 1. The concrete floor 12, of course, is placed above them with perforated metal, wire netting 13, or metal laths resting on the bar joists to hold the concrete while it is in a plastic condition and to strengthen the floor after the concrete is laid.

In the present case, gauges 14 are used, each consisting of soft bendable sheet metal. The gauge is formed with a horizontal part 16 having projecting ears 17 and 18 which may extend laterally or longitudinally. The lateral ones may be perforated at 19 to receive fastening devices. In the form shown in the first five figures, the ears 17 are bent down around the edges of the bar joists 11. In either case, or in both, the gauge 14 is held in place. This gauge 14 is made of sheet metal such as galvanized iron or any other bendable material and it has an upright portion having two vertical bars 20 spaced apart to provide a space 21 in which the pipe 22 or bar 23 can be moved up and down to get it into proper position. The two vertical strips 20 are provided wth perforations 24 located ½" or ¼" apart, as may be desired, and chamfered at 25 to facilitate the insertion of the pipe or bar.

The gauge also comprises the adjustable part 15 which has a flat back and two ears 26 which extend in from the sides and are spaced from the back enough so that they can encompass the two strips 20. Both walls are provided with registering perforations 27. This piece is provided with a tail 28 which, being of flexible bendable metal, can be used in several ways.

In the use of this device the sliding part 15 which constitutes a support for the pipe 22 is moved to the desired height and fastening devices 29 inserted through the perforations 27 and one set of perforations 24 to bring the top of the pipe to exactly the proper height for the thickness of the floor desired. The perforations 24 are so located that this can be done and the floor itself will be exactly 2½" or 3" or any other standard height, as may be required. On this account there is no measuring on the part of the user.

The stationary part 14 of the gauge is secured to the bar joist by flanges 17 or flanges 18 and the sliding support 15 is placed in the proper position and fastened. When all these gauges are in position the pipes 22 are laid in the semi-circular recesses 30 in the tops of the sliding supports 15. These pipes 22 are all therefore located at the right height and perfectly level. The way in which the gauge is fixed in position can be varied considerably. In Fig. 2 the ordinary way is shown in which the ears 17 are simply bent around the edges of the bar joist 11. This holds the whole device with sufficient rigidity. In addition the ears 18 are shown with perforations 19 so that the gauge can be nailed through these perforations to a wooden joist below, when wood is used.

In Figs. 8 and 9 the base 16 of the gauge is turned on the bar joist to a longitudinal position near one edge. The ears 18 are bent around over the edge of the bar joist 35 and under it as shown in Fig. 9. In this case the vertical part 14 is parallel with the edge of the bar joist 35. This arrangement is used where the bar joist or other supporting part is so wide that it is desired to place the gauge in this position or in places where, for one reason or another, it is desired to place the gauge at right angles to the position shown in Fig. 2.

Other ways of holding it are shown in Fig. 10 in which a very wide bar joint 36 is employed. In this case the member 28 is bent around to the side and over the edge of the bar joist at 37, as shown in full lines. In dotted lines in this figure is shown a wire 38 which can be passed through one of the holes 24 of the gauge and bent around the edge of the bar joist 36. Each one of these constructions shown in Fig. 10 serves as an anchor for the gauge and the gauge is used in the same way as has been described.

In Figs. 6 and 7 a modification is shown which has been mentioned before and in this case the adjustable part of the gauge is provided with notches 39 for receiving an angular bar 23 or angle iron serving the same purpose as the pipe 22.

In all these constructions and ways of using the device the same results are secured. The gauge is molded into the concrete with the pipe 22 or angle iron 23 to serve for a guide in smoothing off the top of the floor level. The two projections 20, before the concrete is poured, are bent down, or broken off at a point below the level of the floor so that they will come within the floor itself and present no projections above it. After having been used for the purpose described this gauge, of course, is left in the floor but serves no useful purpose therein afterwards.

Although I have illustrated and described only a few forms of the invention I am aware of the fact that other modifications can be made therein by any person skilled in the art without departing from the scope of the invention as expressed in the claims. Therefore I do not wish to be limited in this respect otherwise than as set forth in the claims, but what I claim is:—

1. In a concrete floor, or the like, the combination with a series of bar joists, of a thin foraminous metal support for the concrete carried on the bar joists, a series of gauges held on the bar joists, and strips supported by the gauges for determining the level of the floor, said gauges each comprising a stationary part and a vertically adjustable part having means for supporting and holding said strips.

2. In an apparatus for use in leveling a concrete floor, or the like, the combination with a series of bar joists, of a series of gauges held on the bar joists, and strips supported by the gauges for determining the level of the floor, said gauges each comprising a stationary part and a vertically adjustable part having means for supporting and holding said strips.

3. In an apparatus of the class described, the combination of the bar joists, gauges fixed thereto and having a vertical part provided with a vertical line of perforations, members movable up and down said vertical part and perforated, means extending through the perforations for securing the movable members at the desired height to said vertical parts and straight strips carried all at the same height by said vertical members.

4. As an article of manufacture, a floor gauge comprising a stationary part having means for anchoring it to the floor supporting means and having a vertical member of soft sheet metal perforated at fixed levels, a movable part having provision for supporting at the top a floor leveling strip and means for securing the movable part to the vertical member at any one of said perforations, said soft member being adapted to have the part thereof projecting above the leveling strip bent down below the floor level.

5. As an article of manufacture, a floor gauge comprising a stationary part having a vertical member of soft sheet metal perforated at fixed levels, a movable part having provision for supporting a floor leveling strip, and means for securing the movable part to the vertical member at any one of said perforations, said stationary part having integral ears projecting from opposite sides and adapted to be bent down around the edges of a supporting member to hold the stationary part in fixed position.

In testimony whereof I have hereunto affixed my signature.

FRANK O. BERGSTRAND.